United States Patent Office 3,840,593
Patented Oct. 8, 1974

---

3,840,593
SEPARATION OF 2,4,5-T AND 2,3,7,8 - TETRACHLORODIBENZO-p-DIOXIN FROM 2 - (2,4,5-TRICHLOROPHENOXY)PROPIONIC ACID CONTAMINATED THEREWITH
Albert Edwin Sidwell, Jacksonville, Ark., assignor to Hercules Incorporated, Wilmington, Del.
No Drawing. Filed Oct. 26, 1971, Ser. No. 192,309
Int. Cl. C07c 65/00
U.S. Cl. 260—521 H                                     3 Claims

ABSTRACT OF THE DISCLOSURE

Disclosed is a process for separating 2,4,5-T and Dioxin from Silvex contaminated therewith. It comprises admixing in an aqueous medium the contaminated Silvex and alkali metal hydroxide such as sodium hydroxide. The alkali metal hydroxide reacts with the Silvex and 2,4,5-T to form alkali metal salts thereof. The resulting reaction mixture is established and maintained in a temperature range in which most of the alkali metal salt of 2,4,5-T is insoluble in the aqueous medium, while most of the alkali metal salt of Silvex is soluble in the aqueous medium. Alkali metal salt of 2,4,5-T is precipitated. After removal of the precipitate, the remaining Dioxin contaminated Silvex alkali metal salt is subjected to fractional, liquid-liquid extraction with a polar liquid solvent consisting essentially of water, and a non-polar liquid solvent, the volumetric ratio of polar solvent to non-polar solvent being selected so that more of the Dioxin is dissolved by the nonpolar liquid solvent than by the polar liquid solvent, while more of the Silvex alkali metal salt is dissolved by the polar liquid solvent than by the non-polar liquid solvent. The result is a raffinate fraction composed of a polar liquid solution of Silvex alkali metal salt in which the weight ratio of Dioxin to Silvex is substantially reduced from the value extant prior to the extraction.

---

This invention is in the chemical arts. It has to do with that part of organic chemistry pertaining to phenoxy herbicides.

In one process for making the herbicide 2-(2,4,5-trichlorophenoxy)propionic acid, commonly known as Silvex, the end product can contain a compound that under some circumstances is highly toxic. This compound commonly called Dioxin, is 2,3,7,8-tetrachlorodibenzo-p-dioxin. Its concentration the end product can be as much as about 80 parts by weight per million parts by weight of Silvex. In addition to the toxicity of Dioxin, there is some evidence this contaminant may have teratogenic properties.

In such process it is also possible for the end product to be contaminated with 2,4,5-trichlorophenoxy acetic acid, commonly known as 2,4,5-T. Concentration of 2,4,5-T in the product can be as much as 1–5 parts by weight per hundred parts by weight of Silvex. This can happen when some of the same equipment employed to make 2,4,5-T or intermediates thereof is also used in the production of Silvex.

A problem to which this invention provides a solution is how to remove both 2,4,5-T and Dioxin from Silvex contaminated with them.

In summary, this invention provides a process for the separation of 2,4,5-T and Dioxin from Silvex contaminated with these compounds. This process comprises: (1) admixing in an aqueous medium the contaminated Silvex with alkali metal hydroxide material, whereby Silvex and 2,4,5-T are converted to the corresponding alkali metal salts, while establishing and maintaining the resulting mixture in the temperature range in which most of the 2,4,5-T alkali metal salt is insoluble, but most of the Silvex alkali metal salt is soluble, whereby 2,4,5-T alkali metal salt precipitates while the Silvex alkali metal salt, contaminated with Dioxin, remains in the resuting solution; (2) separating the solution from the precipitated salt; and (3) effecting fractional, liquid-liquid extraction of the dioxin contaminated Silvex alkali metal salt in the solution with a polar liquid solvent sonsisting essentially of water, and a non-polar liquid solvent, the volumetric ratio of polar solvent to non-polar solvent being selected so that more of the Dioxin is dissolved by the non-polar liquid solvent than by the polar liquid solvent, while more of the Silvex alkali metal salt is dissolved by the polar liquid than by the non-polar liquid solvent. The fractional, liquid-liquid extraction results in a polar solvent solution comprising Silvex alkali metal salt with dioxin at a substantially reduced weight ratio to the salt, and a non-polar solvent solution immiscible with the polar solvent solution and poor or lean in Silvex alkali metal salt, but enriched in dioxin. Subsequently, in a number of embodiments of the process of this invention the silvex alkali metal salt portion of the polar liquid solution is treated to recover Silvex, whereby Silvex with substantially reduced 2,4,5-T and Dioxin contents is obtained.

The alkali metal hydroxide material reacted with the contaminated Silvex in the first step of the process of this invention is material selected from the group of alkali metal hydroxides. These are sodium hydroxide, potassium hydroxide, and the like. In most embodiments of the process of this invention, the alkali metal hydroxide material comprises only one alkali metal hydroxide, and that usually is sodium hydroxide. However, other embodiments of this invention comprise two or more alkali metal hydroxides.

The quantity of alkali metal hydroxide material admixed with the contaminated Silvex is that quantity at which substantially all the 2,4,5-T and Silvex are converted into the corresponding alkali metal salts. Generally the quantity of alkali metal hydroxide material is stoichiometric relative to the quantity of Silvex and the quantity of 2,4,5-T. However, greater and smaller quantities are within the broader concepts of this invention.

The aqueous medium in which the contaminated Silvex and alkali metal hydroxide material are admixed, consists essentially of water. Substances at concentrations which substantially increase the solubility of 2,4,5-T alkali metal salt in the aqueous medium are to be avoided. One such substance is acetonitrile at volumetric ratios of acetonitrile to water in excess of about 1:1.

The quantity of aqueous medium in which the contaminated Silvex and alkali metal hydroxide material are admixed is at least sufficient to dissolve the Silvex alkali metal salt that is formed, but preferably less than sufficient to dissolve a substantial portion of the 2,4,5-T alkali metal salt that is present.

Admixing of the alkali metal hydroxide material and the contaminated Silvex generally is carried out at room temperature (20–25° C.) and at atmospheric pressure. However, higher and lower temperatures, and higher and lower ambient pressures are within the broader concepts of this invention. In this regard, admixing of the alkali metal hydroxide material with the contaminated Silvex may cause the temperature of the resulting reaction mixture to increase substantially because of the heat generated by the reaction of Silvex and 2,4,5-T with the alkali metal hydroxide material. However, after admixture has been effected, preferably the reaction mixture is established and maintained in the temperature range at which at least a substantial portion of the 2,4,5-T alkali metal salt is insoluble, while most of the Silvex alkali metal salt is soluble. Temperatures of 10-30° C. are usually within this range. As a result, a typical precipitate of 2,4,5-T alkali metal salt is formed.

The second step of the process of this invention, separation of 2,4,5-T alkali metal salt precipitate from the reaction mixture, is effected by conventional ways and means. An example is filtration. The remaining part of the reaction mixture is typically a clear solution comprising dioxin contaminated Silvex alkali metal salt.

The third step of the process of this invention involves the admixing of a non-polar liquid solvent with the aqueous solution of Dioxin contaminated Silvex alkali metal salt. The distinction between, and characteristics of, polar and non-polar liquid solvents are well known. In general, polar liquid solvents such as water, methanol, acetone, acetonitrile, and the like are characterized by hydroxyl groups or carbonyl groups associated with strong polarity, by high dielectric constants which are evidence of such polarity, and by water miscibility. In general, non-polar liquid solvents such as benzene, hexane, carbon disulfide, isooctane, and the like, are characterized by weakly polar molecular structures and, accordingly, low dielectric constants. In general, non-polar liquid solvents are water-immiscible. In brief, a characteristic of polar and non-polar liquid solvents is a general immiscibility of polar liquid solvents with non-polar liquid solvents. Partial miscibility frequently does exist depending upon how strongly polar or non-polar the two solvents are. However, under the concepts of this invention there must be sufficient immiscibility not only of the polar liquid solvents and the non-polar liquid solvent, but also of the solutions formed after admixture of the solvents with the Dioxin contaminated Silvex alkali metal salt. Each solvent under the concepts of this invention can be a single liquid or a miscible mixture of liquids as long as the polar liquid consists essentially of water, and the immisciblity of the polar liquid solvent and the non-polar liquid solvent, and of the resulting polar solution and non-polar solution exist. According to this invention, the non-polar liquid solvent must dissolve dioxin at least to a limited extent.

The solvent ratio, that is to say, the volumetric ratio of polar liquid solvent to non-polar liquid solvent, is selected so that upon admixture of the solvents and the Dioxan contaminated Silvex alkali metal salt, more of the Dioxin is dissolved by the non-polar solvent than by the polar solvent, while more of the Silvex alkali metal salt is dissolved by the polar solvent than by the non-polar solvent. This condition is satisfied by a rather broad range of solvent ratios. It is dependent on a number of variables including the solvents, temperature. Dioxin concentration, and the like. However, the optimum solvent ratio can be approximated from the equation:

$$R = \sqrt{\frac{1}{C_s \times C_d}}$$

in which R is the solvent ratio (volumetric basis), $C_s$ is the distribution coefficient or partition ratio of Silvex alkali metal salt in the solvent system at the selected temperature of extraction, $C_d$ is the distribution coefficient or partition ratio of Dioxin in the solvent system at the selected temperature of extraction.

$C_s$ and $C_d$ are determined by application of the following equations:

$$C_s = S/S'$$

in which S stands for grams of Silvex alkali metal salt dissolved per one hundred milliliters of polar liquid solution at the selected temperature of extraction and S' stands for grams of Silvex alkali metal dissolved per one hundred milliliters of non-polar liquid solution at the selected temperature of extraction, and $$C_d = D/D'$$

in which D stands for micrograms of Dioxin dissolved per one hundred milliliters of polar liquid solution at the selected temperature of extraction, and D' stands for micrograms of Dioxin dissolved per one hundred milliliters of non-polar liquid solution at the selected temperature of extraction.

The quantities S and S' can be determined by mixing a 1 gram sample of pure Silvex alkali metal salt with 100 milliliters of each solvent to be employed, separating the resulting phases, measuring the volume of each phase, removing the solvents as by evaporation or distillation, weighing the Silvex alkali metal salt residues, and then calculating for each phase the weight of Silvex alkali metal salt per 100 milliliters of solution.

The quantities D and D' for the Dioxin equation can be determined as follows: A 2.0 milliliter aliquot portion of a solution containing 102 micrograms of Dioxin per milliliter of chloroform is transferred to a 17 milliliter screw cap vial. Chloroform is removed by careful evaporation. 5 Milliliters of the polar liquid solvent and 5 milliliters of the non-polar liquid solvent are added to the vial, which is then sealed and vigorously shaken for 30 seconds. The contents of the vial are permitted to equilibrate at the selected temperature of extraction. An aliquot portion of the resulting non-polar liquid solution is quantatively analyzed by gas chromatography for Dioxin. From the analysis the total quantity of Dioxin in the non-polar solution is calculated. The difference between this value and 204 micrograms (the total quantity of Dioxin in the vial) is the quantity of Dioxin in the polar liquid solution.

The fractional liquid-liquid extraction step of this inventon is preferably performed by admixing the solution of Dioxin-contaminated Silvex alkali metal salt with the non-polar liquid solvent whereby a two phase mixture results, and then separating one phase from the other. The two phase mixture ultimately obtained comprises an aqueous solution of raffinate fraction, and a non-polar liquid solution or extract fraction. Under the concepts of this invention the two fractions are immiscible and do not form stable emulsions under the prevailing process conditions. Hence, after admixture has been completed, coalescence of the phases and phase separation take place. The phases are separated from one another as by decantation, centrifugation or the like.

In the more specific and preferred aspects of this invention the fractional liquid-liquid extraction step is performed by a countercurrent procedure as on a stagewise basis, such as in the apparatus described by Schiebel in the Ind. Chem., 49, 1679–1684 (particularly 1681–1683) (1957), or on a continuous basis in an extraction column such as one of those described in Chemical Engineers' Handbook, Perry, 3rd Ed., 747–753 (1950). A preferred extraction-type column apparatus for these steps is that described in "Technique of Organic Chemistry, Vol. 3, Separation and Purification," second complete revised and augmented edition, Interscience Publishers Inc., 376–386 (particularly shown on page 377) (1956).

The number of extraction stages (theoretical or actual stages of admixing and separating) is selected to give an ultimate raffinate fraction as rich as practical in Silvex alkali metal salt, but with dioxin at or below a selected concentration. The number of extraction stages in general depends on the Dioxin concentration of the Dioxin contaminated Silvex alkali metal salt, the volumetric ratio of the solvent pair, the degree of purity sought in the Silvex product, the efficiency of the extraction system, the apparatus employed, and the like. Hence, for a given Dioxin contaminated Silvex alkali metal salt, a trial run of the extraction procedure usually should be done to determine optimum conditions for the extraction.

The treatment of the raffinate fraction to recover Silvex with a substantially reduced Dioxin content includes removal as by distillation of any codissolved non-polar liquid solvent therefrom, and then reacting the Silvex alkali metal salt with a mineral acid such as hydrochloric acid to convert the Silvex alkali metal salt to Silvex. The Silvex precipitates, and the precipitated Silvex is separated as by filtration, washing and drying.

In some embodiments of the process of this invention each of the steps is carried out on a batch basis. In other embodiments one or more of the steps is or are carried out on a continuous basis. In all embodiments of the process it is preferred to recover and recycle the alkali metal hydroxide material and solvents. Generally, the extract fraction is distilled to recover non-polar liquid solvent substantially free of Dioxin, and the Dioxin loaded residue is destroyed as by incineration. The sodium salt of 2,4,5-T can be treated to recover 2,4,5-T, or destroyed.

The best mode now contemplated for carrying out this invention is illustrated by the following example of a specific embodiment of the invention. In the example all parts by weight are indicated by $w$, all parts by volume are indicated by $v$, and $w$ is to $v$ as the kilogram is to the liter.

Example

This example illustrates the practice of one specific embodiment of the process of this invention.

Into a reactor equipped with a mixer are charged 2,4,5-T and Dioxin contaminated Silvex ($100w$) having a 2,4,5-T content of 1 part by weight per hundred parts by weight of the Silvex, and a Dioxin content of 1–5 parts by weight per million parts by weight of the Silvex. Also introduced into the reactor is water ($250v$) and sodium hydroxide ($30w$) as a 50% by weight aqueous solution. The resulting mixture is agitated for a period of about 10 minutes. During this period of time the 2,4,5-T and Silvex react with the sodium hydroxide and the resulting Silvex alkali metal salt dissolves. However, the 2,4,5-T alkali metal salt does not dissolve, but remains as a typical suspended solid. The reaction mixture is allowed to cool to room temperature from the temperature reached after addition of the sodium hydroxide, a difference of about 40° C. The cooled reaction mixture is filtered on a suction filter to remove the precipitated 2,4,5-T sodium salt. The solids are washed with a small quantity of 0.1N aqueous solution of sodium hydroxide, and the washings are added to the main filtrate.

The clear filtrate and washings from the filtration are introduced into a separator with a mixer and containing hexane ($150v$). The resulting mixture is vigorously agitated for about 6 minutes and then established and maintained in quiesence for coalescence and separation of the resulting two phases. The bottom aqueous phase is withdrawn from the separator and introduced into a second separator equipped with a mixer and containing hexane ($150v$). The mixture is vigorously agitated for about 6 minutes and then left quiesent for about 10 minutes for coalescence and separation of the resulting phases. The lower phase is withdrawn from the second separator and introduced into a third separator equipped with a mixer and containing hexane ($150v$). The mixture in the third separator is vigorously agitated for about 6 minutes and then left in quiescence for about 10 minutes for phase coalescense and separation to take place. The bottom layer is withdrawn from the third separator and introduced into a distillation pot. The contents of the pot are heated to remove codissolved hexane, and then cooled to 80–85° C. The solution is transferred to a reactor equipped with a mixer, and while agitating the solution 0.1N aqueous solution of hydrochloric acid is added until the pH of the resulting reaction mixture is 1.2. During this addition, Silvex alkali metal salt reacts with the hydrochloric acid to form Silvex which is insoluble and precipitates. When the reaction mixture reaches room temperature, the reaction mixture is filtered and the filter cake washed with 0.1N aqueous solution ($35v$) of hydrochloric acid and then with a small quantity of water. The washed solids are permitted to drain under suction until liquid fails to drip from the filter. The filter cake is then dried to a constant weight at a temperature of 100–102° C. The 2,4,5-T content of the Silvex product ($98.9w$) thus obtained is typically less than 0.25 part by weight per hundred parts by weight of Silvex and the Dioxin content is typically less than 0.1 part by weight per million parts by weight of Silvex.

Thus, this invention provides a process for the removal of 2,4,5-T and Dioxin from Silvex contaminated therewith.

An advantage of the process is that it can be practiced with readily available inexpensive chemicals and in conventional equipment.

Other features, advantages and specific embodiments of this invention will become readily apparent to those exercising ordinary skill in the art after reading the foregoing disclosures. Such specific embodiments are within the scope of the claimed subject matter unless expressly indicated to the contrary by claim language. Moreover, while specific embodiments of this invention have been described in considerable detail, variations and modifications of them can be effected without departing from the spirit and scope of the invention as disclosed and claimed.

The expression "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

I claim:

1. A process for separating 2,4,5-T and Dioxin from Silvex contaminated with 2,4,5-T up to about 1–5 parts by weight per hundred parts by weight of Silvex, and with Dioxin up to about 80 parts by weight per million parts by weight of Silvex, which comprises: (1) admixing in an aqueous medium said contaminated Silvex with a quantity of alkali metal hydroxide material sufficient to convert 2,4,5-T and Silvex to the corresponding alkali metal salts, while establishing and maintaining the resulting reaction mixture in a temperature range in which the 2,4,5-T alkali metal salt is substantially insoluble and the Silvex alkali metal salt is substantially soluble, whereby 2,4,5-T alkali metal salt is precipitated; (2) separating precipitated 2,4,5-T alkali metal salt from the resulting reaction mixture; (3) effecting fractional liquid-liquid extraction of the Dioxin-contaminated Silvex alkali metal salt portion of said reaction mixture with a polar liquid solvent consisting essentially of water, and a non-polar liquid solvent, the volumetric ratio of polar liquid solvent to non-polar liquid solvent being selected so that more Silvex alkali metal salt is dissolved by the polar liquid solvent than by the non-polar liquid solvent, while more Dioxin is dissolved by the non-polar liquid solvent than by the polar liquid solvent, whereby there are obtained an extract fraction with a substantial portion of the Dioxin, and a raffinate fraction comprising Silvex alkali metal salt; and (4) treating said raffinate fraction to recover Silvex therefrom.

2. A process according to claim 1 in which said alkali metal hydroxide material consists essentially of sodium hydroxide.

3. A process according to claim 2 in which the treatment of said raffinate fraction comprises reacting the Silvex alkali metal salt portion thereof with a mineral acid, whereby Silvex is formed.

References Cited

UNITED STATES PATENTS

| 2,588,336 | 3/1952 | Meyer | 260—521 R |
| 2,588,679 | 3/1952 | Williams et al. | 260—521 R |
| 3,427,357 | 2/1969 | DeGramont et al. | 260—652 |
| 2,509,772 | 5/1950 | Leazer | 260—521 |

(Other references on following page)

FOREIGN PATENTS 250,154 1/1970 U.S.S.R. .......... 260—521 A
6,500,303 7/1966 Netherlands.

OTHER REFERENCES

Perry et al. Chemical Engineering Handbook, McGraw-Hill Book Co. (1950), (14–40)–(14–42).

Kirk-Othmer—"Encyclopedia of Chemical Technology," Vol. 8, (1965), pp. 719–733.

Markin, C. A. 69, 18183a.

Stanek et al., C. A. 72, 1970.

LORRAINE A. WEINBERGER, Primary Examiner
J. F. TERAPANE, Assistant Examiner

U.S. Cl. X.R.

260—340.3